(12) United States Patent
Ledvina et al.

(10) Patent No.: US 11,221,253 B2
(45) Date of Patent: Jan. 11, 2022

(54) SYSTEM WITH A SPAD-BASED SEMICONDUCTOR DEVICE HAVING DARK PIXELS FOR MONITORING SENSOR PARAMETERS

(71) Applicant: SEMICONDUCTOR COMPONENTS INDUSTRIES, LLC, Phoenix, AZ (US)

(72) Inventors: Jan Ledvina, Tovacov (CZ); Ivan Koudar, Modrice (CZ); Dariusz Piotr Palubiak, Cork (IE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/247,276

(22) Filed: Dec. 7, 2020

(65) Prior Publication Data
US 2021/0223098 A1    Jul. 22, 2021

Related U.S. Application Data

(60) Provisional application No. 62/963,658, filed on Jan. 21, 2020.

(51) Int. Cl.
*G01J 1/44* (2006.01)

(52) U.S. Cl.
CPC ........... *G01J 1/44* (2013.01); *G01J 2001/442* (2013.01); *G01J 2001/444* (2013.01); *G01J 2001/4466* (2013.01)

(58) Field of Classification Search
CPC ................ G01J 1/44; G01J 2001/4406; G01J 2001/442; G01J 2001/444;
(Continued)

(56) References Cited

U.S. PATENT DOCUMENTS 7,456,441 B2 * 11/2008 Tyler .................. H01L 27/0262
257/173
9,310,247 B2 * 4/2016 Raynor .................... G01J 1/44
(Continued)

FOREIGN PATENT DOCUMENTS

| DE | 19857838 B4 | 1/2006 |
|---|---|---|
| DE | 212018000118 U1 | 8/2019 |
| EP | 3339888 A1 | 6/2018 |

OTHER PUBLICATIONS

Licciulli et al. "A Novel Technique for the Stabilization of SiPM Gain Against Temperature Variations"; IEEE Transactions on Nuclear Science, vol. 60, issue 2, Apr. 2013.

(Continued)

*Primary Examiner* — John R Lee
(74) *Attorney, Agent, or Firm* — Treyz Law Group, P.C.; Joseph F. Guihan

(57) ABSTRACT

A semiconductor device may include a plurality of single-photon avalanche diodes (SPADs). The semiconductor device may include sensing single-photon avalanche diodes that are sensitive to incident light and dark single-photon avalanche diodes that are shielded from incident light. The dark single-photon avalanche diodes may be used to measure one or more parameters for the semiconductor device such as breakdown voltage, dark count rate, and quench resistance. Processing circuitry may optimize a bias voltage for the semiconductor device based on information regarding one or more sensor parameters obtained using the dark single-photon avalanche diodes.

12 Claims, 9 Drawing Sheets

(58) Field of Classification Search
CPC ......... G01J 2001/4446; G01J 2001/446; G01J 2001/4466
See application file for complete search history.

(56) References Cited

U.S. PATENT DOCUMENTS

| | | | | |
|---|---|---|---|---|
| 9,823,123 | B2* | 11/2017 | Tsai | G01J 1/44 |
| 10,686,418 | B1* | 6/2020 | Murata | G01D 5/24 |
| 2011/0248175 | A1 | 10/2011 | Frach et al. | |
| 2013/0092842 | A1 | 4/2013 | Zhang et al. | |
| 2014/0061443 | A1* | 3/2014 | Jiang | H01L 31/02027 250/214 SW |
| 2014/0191115 | A1* | 7/2014 | Webster | H01L 27/14609 250/214 R |
| 2014/0231630 | A1* | 8/2014 | Rae | G01S 7/497 250/214.1 |
| 2015/0177394 | A1 | 6/2015 | Dolinsky et al. | |
| 2020/0044098 | A1* | 2/2020 | Azuma | H01L 31/10 |
| 2020/0173846 | A1* | 6/2020 | Moore | G01S 17/08 |
| 2020/0182692 | A1* | 6/2020 | Lilic | G01J 1/44 |
| 2020/0252564 | A1* | 8/2020 | Palubiak | H01L 27/14643 |
| 2021/0223098 | A1* | 7/2021 | Ledvina | G01J 1/44 |

OTHER PUBLICATIONS

Lilic et al. "Excess Bias Voltage Monitoring Circuit"; IEEE 61st International Midwest Symposium on Circuits and Systems (MWSCAS), Windsor, ON, Canada, 2018, pp. 113-116.

Zheng et al. "An Integrated Bias Voltage Control Method for SPAD Arrays"; IEEE Photonics Technology Letters, vol. 30, No. 19, pp. 1723-1726, Oct. 1, 2018.

Zimmer et al. "Device and Method for a Precise Breakdown Voltage Detection of APD/SPAD in a Dark Environment"; 2nd International SPAD Sensor Workshop, Jun. 8, 2020.

* cited by examiner

US 11,221,253 B2

SYSTEM WITH A SPAD-BASED SEMICONDUCTOR DEVICE HAVING DARK PIXELS FOR MONITORING SENSOR PARAMETERS

This application claims the benefit of provisional patent application No. 62/963,658, filed Jan. 21, 2020, which is hereby incorporated by reference herein in its entirety.

BACKGROUND

This relates generally to imaging systems and, more particularly, to imaging systems that include single-photon avalanche diodes (SPADs) for single photon detection.

Modern electronic devices such as cellular telephones, cameras, and computers often use digital image sensors. Image sensors (sometimes referred to as imagers) may be formed from a two-dimensional array of image sensing pixels. Each pixel typically includes a photosensitive element (such as a photodiode) that receives incident photons (light) and converts the photons into electrical signals.

Conventional image sensors may suffer from limited functionality in a variety of ways. For example, some conventional image sensors may not be able to determine the distance from the image sensor to the objects that are being imaged. Conventional image sensors may also have lower than desired image quality and resolution.

To improve sensitivity to incident light, single-photon avalanche diodes (SPADs) may sometimes be used in imaging systems. Single-photon avalanche diodes may be capable of single-photon detection.

It is within this context that the embodiments described herein arise.

DETAILED DESCRIPTION

Embodiments of the present invention relate to imaging systems that include a single-photon avalanche diode (SPAD) based sensor.

Some imaging systems include image sensors that sense light by converting impinging photons into electrons or holes that are integrated (collected) in pixel photodiodes within the sensor array. After completion of an integration cycle, collected charge is converted into a voltage, which is supplied to the output terminals of the sensor. In complementary metal-oxide semiconductor (CMOS) image sensors, the charge to voltage conversion is accomplished directly in the pixels themselves, and the analog pixel voltage is transferred to the output terminals through various pixel addressing and scanning schemes. The analog pixel voltage can also be later converted on-chip to a digital equivalent and processed in various ways in the digital domain.

In single-photon avalanche diode (SPAD) devices, on the other hand, the photon detection principle is different. A SPAD device may include silicon photomultiplier (SiPM) pixels that each include a plurality of single-photon avalanche diodes. Each single-photon avalanche diode (SPAD) is biased far above its breakdown point, and when an incident photon generates an electron or hole, this carrier initiates an avalanche breakdown with additional carriers being generated. The avalanche multiplication may produce a current signal that can be easily detected by readout circuitry associated with the SiPM pixel. The avalanche process can be stopped (or quenched) by lowering the diode bias below its breakdown point. Each single-photon avalanche diode (SPAD) inside the SiPM pixel may therefore include a passive and/or active quenching circuit for halting the avalanche.

This concept can be used in two ways. First, the arriving photons may simply be counted (e.g., in low light level applications). Second, the SiPM pixels may be used to measure photon time-of-flight (ToF) from a synchronized light source to a scene object point and back to the sensor, which can be used to obtain a 3-dimensional image of the scene.

Figure 1:
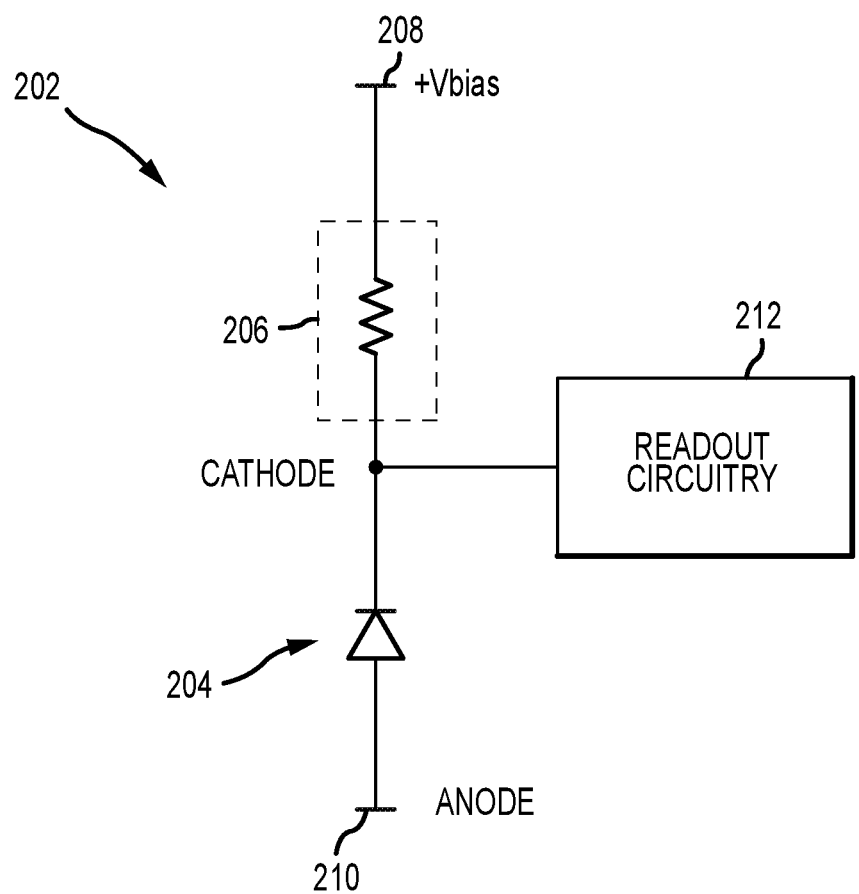
FIG. 1 is a circuit diagram showing an illustrative single-photon avalanche diode (SPAD) pixel in accordance with an embodiment.

FIG. 1 is a circuit diagram of an illustrative SPAD device 202. As shown in FIG. 1, SPAD device 202 includes a SPAD 204 that is coupled in series with quenching circuitry 206 between a first supply voltage terminal 210 (e.g., a ground power supply voltage terminal) and a second supply voltage terminal 208 (e.g., a positive power supply voltage terminal). In particular, SPAD device 202 includes a SPAD 204 having an anode terminal connected to power supply voltage terminal 210 and a cathode terminal connected directly to quenching circuitry 206. SPAD device 202 that includes SPAD 204 connected in series with a quenching resistor 206 is sometimes referred to collectively as a photo-triggered unit or "microcell." During operation of SPAD device 202, supply voltage terminals 208 and 210 may be used to bias SPAD 204 to a voltage that is higher than the breakdown voltage (e.g., bias voltage Vbias is applied to terminal 208). Breakdown voltage is the largest reverse voltage that can be applied to SPAD 204 without causing an exponential increase in the leakage current in the diode. When SPAD 204 is reverse biased above the breakdown voltage in this manner, absorption of a single-photon can trigger a short-duration but relatively large avalanche current through impact ionization.

Quenching circuitry 206 (sometimes referred to as quenching element 206) may be used to lower the bias voltage of SPAD 204 below the level of the breakdown voltage. Lowering the bias voltage of SPAD 204 below the breakdown voltage stops the avalanche process and corresponding avalanche current. There are numerous ways to form quenching circuitry 206. Quenching circuitry 206 may be passive quenching circuitry or active quenching circuitry. Passive quenching circuitry may, without external control or monitoring, automatically quench the avalanche current once initiated. For example, FIG. 1 shows an example where a resistor component is used to form quenching circuitry 206. This is an example of passive quenching circuitry.

This example of passive quenching circuitry is merely illustrative. Active quenching circuitry may also be used in SPAD device 202. Active quenching circuitry may reduce the time it takes for SPAD device 202 to be reset. This may allow SPAD device 202 to detect incident light at a faster rate than when passive quenching circuitry is used, improving the dynamic range of the SPAD device. Active quenching circuitry may modulate the SPAD quench resistance. For example, before a photon is detected, quench resistance is set high and then once a photon is detected and the avalanche is quenched, quench resistance is minimized to reduce recovery time.

SPAD device 202 may also include readout circuitry 212. There are numerous ways to form readout circuitry 212 to obtain information from SPAD device 202. Readout circuitry 212 may include a pulse counting circuit that counts arriving photons. Alternatively or in addition, readout circuitry 212 may include time-of-flight circuitry that is used to measure photon time-of-flight (ToF). The photon time-of-flight information may be used to perform depth sensing. In one example, photons may be counted by an analog counter to form the light intensity signal as a corresponding pixel voltage. The ToF signal may be obtained by also converting the time of photon flight to a voltage. The example of an analog pulse counting circuit being included in readout circuitry 212 is merely illustrative. If desired, readout circuitry 212 may include digital pulse counting circuits. Readout circuitry 212 may also include amplification circuitry if desired.

The example in FIG. 1 of readout circuitry 212 being coupled to a node between diode 204 and quenching circuitry 206 is merely illustrative. Readout circuitry 212 may be coupled to terminal 208 or any desired portion of the SPAD device. In some cases, quenching circuitry 206 may be considered integral with readout circuitry 212.

Because SPAD devices can detect a single incident photon, the SPAD devices are effective at imaging scenes with low light levels. Each SPAD may detect the number of photons that are received within a given period of time (e.g., using readout circuitry that includes a counting circuit). However, as discussed above, each time a photon is received and an avalanche current initiated, the SPAD device must be quenched and reset before being ready to detect another photon. As incident light levels increase, the reset time becomes limiting to the dynamic range of the SPAD device (e.g., once incident light levels exceed a given level, the SPAD device is triggered immediately upon being reset).

Figure 2:
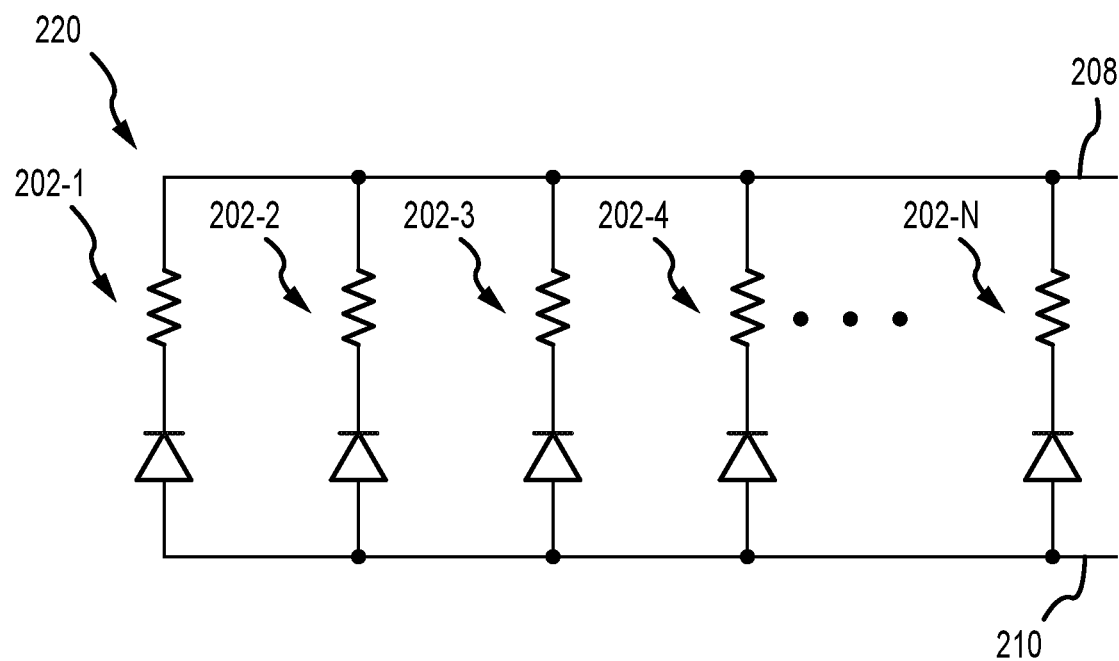
FIG. 2 is a diagram of an illustrative silicon photomultiplier in accordance with an embodiment.

Multiple SPAD devices may be grouped together to help increase dynamic range. FIG. 2 is a circuit diagram of an illustrative group 220 of SPAD devices 202. The group or array of SPAD devices may sometimes be referred to as a silicon photomultiplier (SiPM). As shown in FIG. 2, silicon photomultiplier 220 may include multiple SPAD devices that are coupled in parallel between first supply voltage terminal 208 and second supply voltage terminal 210. FIG. 2 shows N SPAD devices 202 coupled in parallel (e.g., SPAD device 202-1, SPAD device 202-2, SPAD device 202-3, SPAD device 202-4, . . . , SPAD device 202-N). More than two SPAD devices, more than ten SPAD devices, more than one hundred SPAD devices, more than one thousand SPAD devices, etc. may be included in a given silicon photomultiplier 220.

Each SPAD device 202 may sometimes be referred to herein as a SPAD pixel 202. Although not shown explicitly in FIG. 2, readout circuitry for the silicon photomultiplier 220 may measure the combined output current from all of SPAD pixels in the silicon photomultiplier. Configured in this way, the dynamic range of an imaging system including the SPAD pixels may be increased. Each SPAD pixel is not guaranteed to have an avalanche current triggered when an incident photon is received. The SPAD pixels may have an associated probability of an avalanche current being triggered when an incident photon is received. There is a first probability of an electron being created when a photon reaches the diode and then a second probability of the electron triggering an avalanche current. The total probability of a photon triggering an avalanche current may be referred to as the SPAD's photon-detection probability (PDP). Each SPAD device may also have an associated photon-detection efficiency (PDE) which is a product of fill factor and PDP. Grouping multiple SPAD pixels together in the silicon photomultiplier therefore allows for a direct measurement of the incoming incident light. For example, if a single SPAD pixel has a PDE of 50% and receives one photon during a time period, there is a 50% chance the photon will not be detected. With the silicon photomultiplier 220 of FIG. 2, chances are that two of the four SPAD pixels will detect the photon, thus improving the provided image data for the time period.

The example of FIG. 2 in which the plurality of SPAD pixels 202 share a common output in silicon photomultiplier 220 is merely illustrative. In the case of an imaging system including a silicon photomultiplier having a common output for all of the SPAD pixels, the imaging system may not have any resolution in imaging a scene (e.g., the silicon photomultiplier can just detect photon flux at a single point). It may be desirable to use SPAD pixels to obtain image data across an array to allow a higher resolution reproduction of the 3D imaged scene. In cases such as these, SPAD pixels in a single imaging system may have per-pixel readout capabilities. Alternatively, an array of silicon photomultipliers (each including more than one SPAD pixel) may be included in the imaging system. The outputs from each pixel or from each silicon photomultiplier may be used to generate image data for an imaged scene. The array may be capable of independent detection (whether using a single SPAD pixel or a plurality of SPAD pixels in a silicon photomultiplier) in a line array (e.g., an array having a single row and multiple columns or a single column and multiple rows) or an array having more than ten, more than one hundred, or more than one thousand rows and/or columns.

While there are a number of possible use cases for SPAD pixels as discussed above, the underlying technology used to detect incident light is the same. All of the aforementioned examples of devices that use SPAD pixels may collectively be referred to as SPAD-based semiconductor devices. A silicon photomultiplier with a plurality of SPAD pixels (microcells) having a common output may be referred to as a SPAD-based semiconductor device. An array of SPAD pixels with per-pixel readout capabilities may be referred to as a SPAD-based semiconductor device (or a SPAD array). An array of silicon photomultipliers with per-silicon-photomultiplier readout capabilities may be referred to as a SPAD-based semiconductor device.

Figure 3:
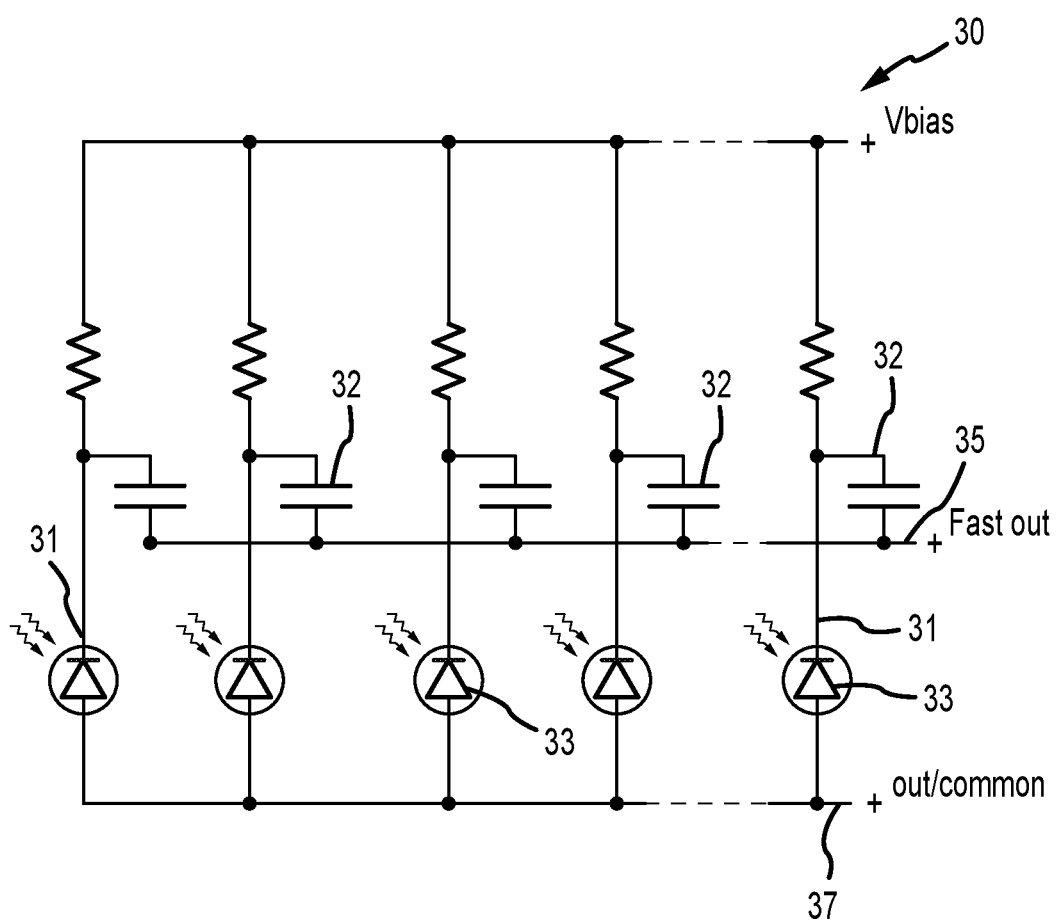
FIG. 3 is a diagram of an illustrative silicon photomultiplier with a fast output terminal in accordance with an embodiment.

FIG. 3 illustrates a silicon photomultiplier 30. As shown in FIG. 3, SiPM 30 has a third terminal 35 which is capacitively coupled to each cathode terminal 31 in order to provide a fast readout of the avalanche signals from the SPADs 33. When then SPADs 33 emits a current pulse, part of the resulting change in voltage at the cathode 31 will be coupled via the mutual capacitance into the third ("fast") output terminal 35. Using the third terminal 35 for readout avoids the compromised transient performance resulting from the relatively large RC time constant associated with the biasing circuit that biases the top terminal of the quenching resistor.

Figure 4:
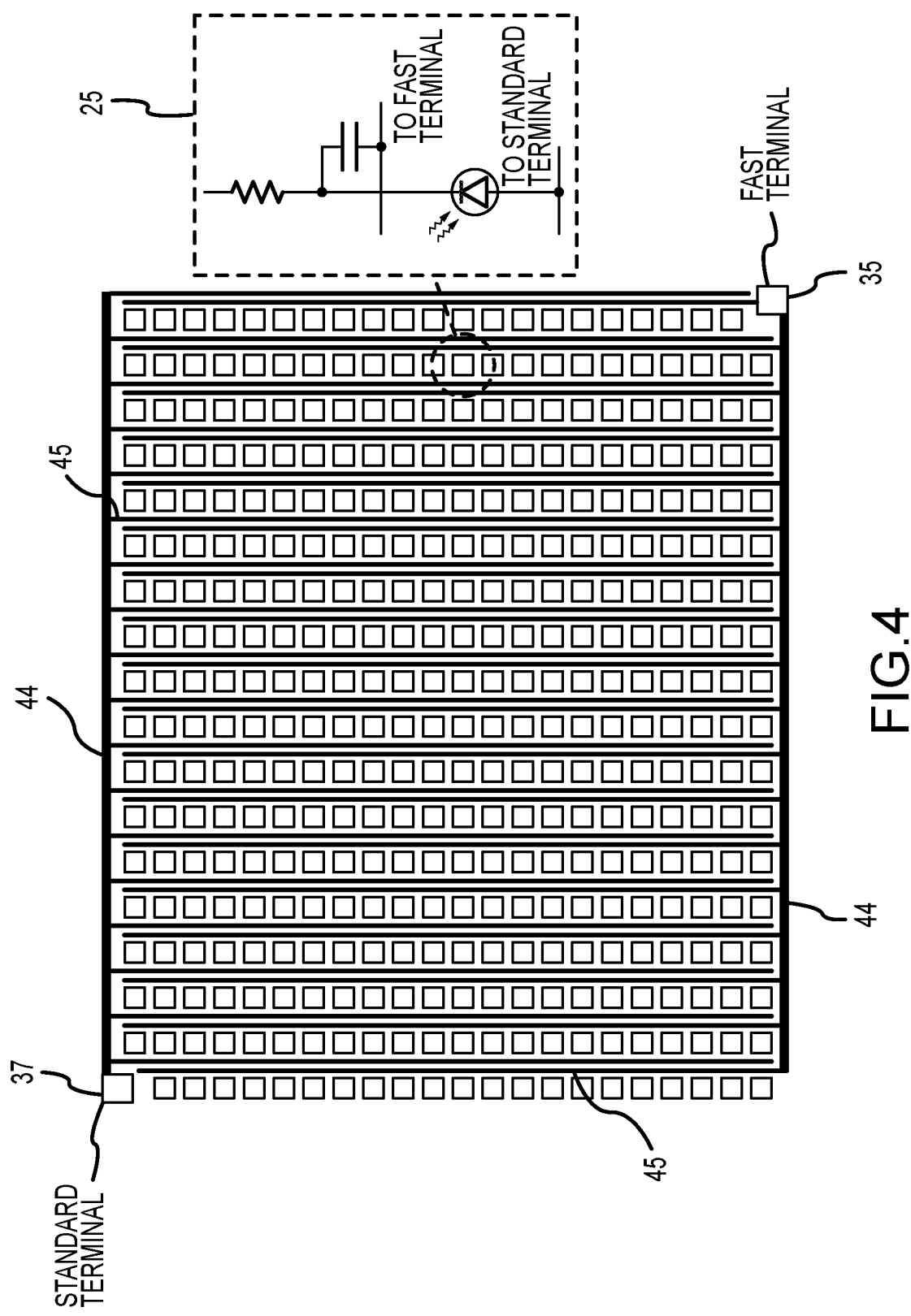
FIG. 4 is a diagram of an illustrative silicon photomultiplier comprising an array of microcells (SPAD diodes) in accordance with an embodiment.

It will be appreciated by those skilled in the art that silicon photomultipliers include major bus lines 44 and minor bus lines 45 as illustrated in FIG. 4. The minor bus liens 45 may connect directly to each individual microcell 25. The minor bus lines 45 are then coupled to the major bus lines 44 which connect to the bond pads associated with terminals 37 and 35. Typically, the minor bus lines 45 extend vertically between the columns of microcells 25, whereas the major bus lines 44 extend horizontally adjacent the outer row of the microcells 25.

Figure 5:
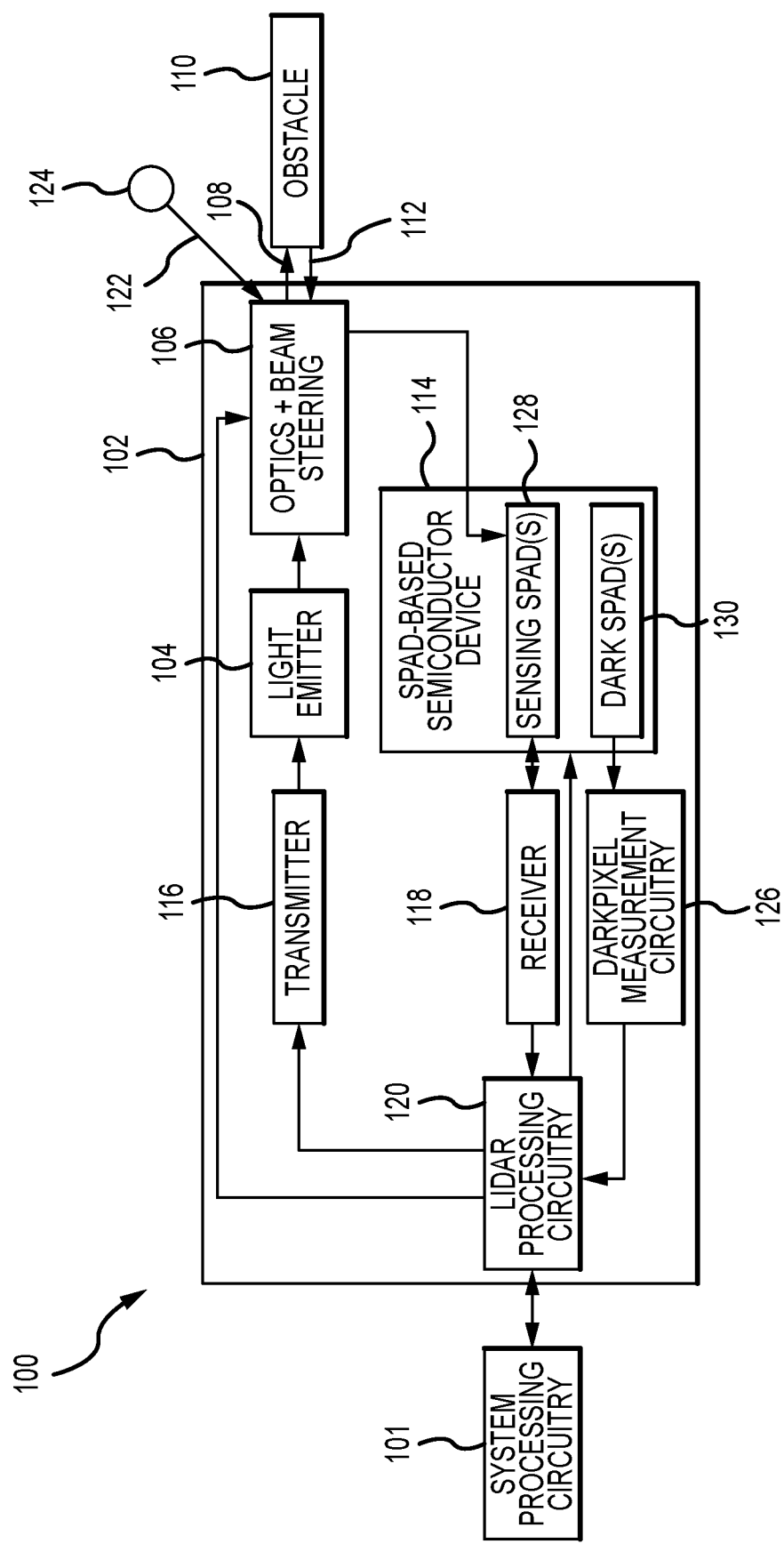
FIG. 5 is a diagram of an illustrative imaging system that includes a SPAD-based semiconductor device in accordance with an embodiment.

FIG. 5 is a schematic diagram of an illustrative system that includes a light detection and ranging (LIDAR) imaging system. System 100 of FIG. 5 may be vehicle safety system (e.g., an active braking system or other vehicle safety system), a surveillance system, a medical imaging system, a general machine vision system, or any other desired type of system.

System 100 may provide a user with numerous high-level functions. In a computer or advanced cellular telephone, for example, a user may be provided with the ability to run user applications. To implement these functions, the imaging system may include input-output devices such as keypads, buttons, input-output ports, joysticks, and displays. Additional storage and processing circuitry such as volatile and nonvolatile memory (e.g., random-access memory, flash memory, hard drives, solid state drives, etc.), microprocessors, microcontrollers, digital signal processors, application specific integrated circuits, and/or other processing circuits may also be included in the system.

The input-output devices in system 100 may include output devices that work in combination with the SPAD-based semiconductor device. For example, a light-emitting component (such as a light emitter 104) may be included in the imaging system to emit light (e.g., near infrared (NIR) light or light of any other desired type). A NIR laser may be used as light emitter 104.

System 100 includes a LIDAR-based imaging system 102, sometimes referred to as a LIDAR module. LIDAR module 102 may be used to capture 3D images of a scene and measure distances to obstacles in the scene.

In a vehicle safety system, information from the LIDAR module may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, a LIDAR module may form part of a semi-autonomous or autonomous self-driving vehicle.

LIDAR module 102 may include a light emitter 104 (e.g., a laser) that emits light 108 to illuminate an obstacle 110. The laser may emit light 108 at any desired wavelength (e.g., infrared light, visible light, etc.). Optics and beam-steering equipment 106 may be used to direct the light beam from laser 104 towards obstacle 110. Light 108 may illuminate obstacle 110 and return to the LIDAR module as a reflection 112. One or more lenses in optics and beam-steering 106 may focus the reflected light 112 onto SPAD-based semiconductor device 114.

SPAD-based semiconductor device 114 may be a silicon photomultiplier and may include a plurality of single-photon avalanche diodes (microcells). The SPAD pixels together with time-to-digital conversion (TDC) circuitry in receiver 118 may be used to measure photon time-of-flight (ToF) from a synchronized light source (e.g., laser 104) to a scene object point and back to the sensor, which can be used to obtain a 3-dimensional image of the scene.

The SPAD-based semiconductor device 114 may have any number of SPAD pixels (e.g., two, more than two, more than ten, more than one hundred, more than one thousand, more than one million, etc.). In some SPAD-based semiconductor devices, each SPAD pixel may be covered by a respective wavelength filter element and/or microlens. The SPAD-based semiconductor device 114 may optionally include additional circuitry such as logic gates, digital counters, time-to-digital converters, bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

The LIDAR module 102 may also include a transmitter 116 and receiver 118. LIDAR processing circuitry 120 may control transmitter 116 to emit light from laser 104 (e.g., transmitter 116 may be a driver for the laser). Receiver 118 may include one or more comparators that are configured to determine the magnitude of one or more signals received by the silicon photomultiplier. The LIDAR processing circuitry 120 may receive data from receiver 118 (and SPAD-based semiconductor device 114). Based on the data from SPAD-based semiconductor device 114, LIDAR processing circuitry 120 may determine a distance to the obstacle 110. The LIDAR processing circuitry 120 may communicate with system processing circuitry 101. System processing circuitry 101 may take corresponding action (e.g., on a system-level) based on the information from LIDAR module 102.

LIDAR processing circuitry 120 and/or system processing circuitry 101 may be used to perform image processing functions such as automatic focusing functions, depth sensing, data formatting, adjusting white balance and exposure, implementing video image stabilization, face detection, etc. For example, during automatic focusing operations, processing circuitry may process data gathered by the SPAD pixels to determine the magnitude and direction of lens movement (e.g., movement of a lens in optics and beam steering 106 or another lens in the system) needed to bring an object of interest into focus. Processing circuitry may process data gathered by the SPAD pixels to determine a depth map of the scene. Receiver 118, LIDAR processing circuitry 120, dark pixel measurement circuitry 126, and/or system processing circuitry may all collectively, in some subset, and/or individually be referred to as processing circuitry.

A LIDAR module may include multiple LIDAR channels. A channel may refer to the output of a respective subset of SPADs in the SPAD-based semiconductor device 114. As previously mentioned, all SPADs on the SiPM sensor may have a common output (e.g., the sensor may have a single channel). In other embodiments, respective groups of SPADs may have respective outputs (e.g., the sensor may have different channels). The groups of SPADs associated with each different channel may be referred to as silicon photomultiplier sensor pixels or may simply be referred to as separate silicon photomultipliers on the silicon photomultiplier sensor.

Performance of the LIDAR based imaging system 102 may be impacted by ambient light levels. As shown in FIG. 5, SPAD-based semiconductor device 114 may receive ambient light 122 from ambient light source 124 in addition to reflections 112 from obstacle 110.

As shown in FIG. 5, SPAD-based semiconductor device 114 includes both a sensing portion 128 and a dark portion 130. The sensing portion 128 may be used measure light that is received by the sensor (e.g., through optics 106) from reflections 112 and/or ambient light 122. Dark portion 130 may include single-photon avalanche diodes that are shielded from all incident light. Shielding SPADs 130 in this way may allow for additional information to be actively determined about sensor 114.

One key parameter that affects the single-photon avalanche diodes of sensor 114 is breakdown voltage ($V_{BR}$). The breakdown voltage may be the reverse bias voltage above which an avalanche breakdown may occur. During operation, the single-photon avalanche diodes of sensor 114 may be reverse biased by a bias voltage ($V_{BIAS}$) that is equal to the breakdown voltage plus an over voltage ($V_{OV}$, sometimes referred to as over bias). In other words, $V_{BIAS}=V_{OV}+V_{BR}$. The magnitude of $V_{OV}$ may impact performance of the sensor (e.g., a higher $V_{OV}$ may increase the likelihood of an avalanche breakdown). $V_{BIAS}$ may be controllable in the sensor. However, without knowing the magnitude of $V_{BR}$, the exact magnitude of $V_{OV}$ cannot be known. Actively measuring $V_{BR}$ may therefore allow for better optimizing of $V_{BIAS}$ by $V_{OV}$ adjustment during operation of the LIDAR imaging system.

Dark pixel measurement circuitry 126 may use output from dark portion 130 of sensor 114 to determine parameters such as breakdown voltage. This information is in turn provided to LIDAR processing circuitry 120. Additional parameters may influence the optimal bias voltage for the SPADs in SPAD-based semiconductor device 114. Dark pixel measurement circuitry may therefore also determine dark count rate (e.g., the amount of avalanches caused by carriers recombination or internal optical crosstalk between adjacent SPADs), and quench resistance, and any other desired sensor parameters. This information is provided to LIDAR processing circuitry 120 and used to determine an optimal bias voltage for the SPAD-based semiconductor device.

Figure 6:
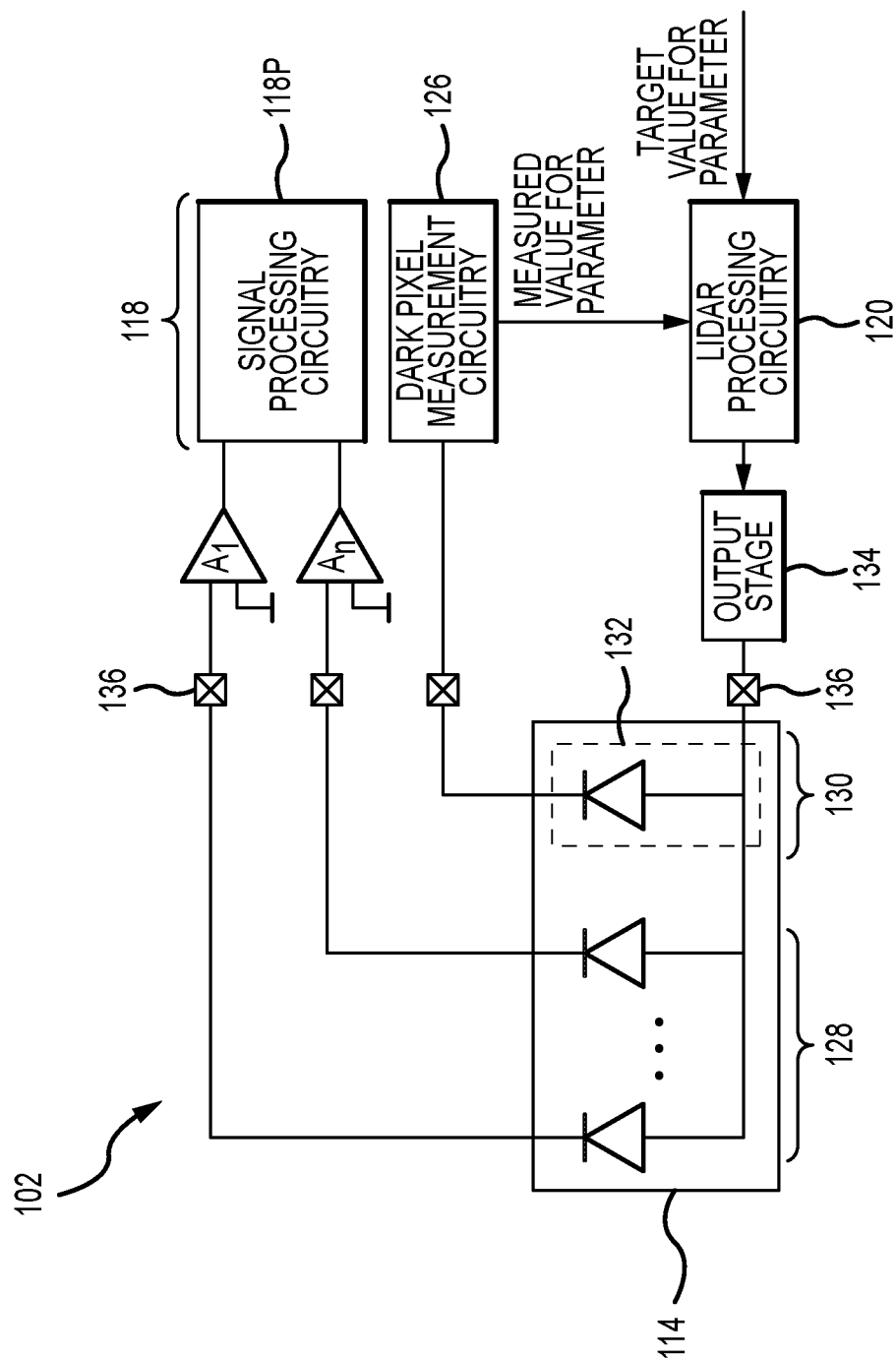
FIG. 6 is a diagram of an illustrative LIDAR module that includes dark pixel measurement circuitry for optimizing a sensor parameter in accordance with an embodiment.

As shown in FIG. 6, single-photon avalanche diode array 114 may include a plurality of unshielded single-photon avalanche diodes 128 for sensing incident light. At least one shielded single-photon avalanche diode 130 is shielded by shield 132 (e.g., a shield formed from opaque metal or another opaque material). Each subset of unshielded single-photon avalanche diodes with a common output may be referred to as a discrete silicon photomultiplier or as a pixel (e.g., channel) of larger silicon photomultiplier 114. Dark pixel measurement circuitry 126 may be used to measure desired characteristics of the sensor based on outputs from the one or more shielded SPADs 130. The shielded SPADs 130 may have one output channel or multiple output channels.

Each LIDAR channel may have a corresponding amplifier in receiver 118. As shown, channel 1 has an amplifier A1, channel 2 has an amplifier A2, . . . , channel n has an amplifier An. The outputs of the amplifiers may be coupled to signal processing circuitry 118P. The inputs and outputs of the amplifier may both be referred to as output signals from silicon photomultiplier 114. In other words, the amplified signal from sensor 114 may still be referred to as an output signal from sensor 114. The signal processing circuitry 118P may include one or more comparators for identifying the magnitude of the signals from the amplifiers. Each comparator may have a corresponding reference signal of a unique magnitude. The outputs of the comparators indicate whether the signal from SPAD-based semiconductor device 114 is greater or less than the corresponding reference signals. These comparator outputs may be used (e.g., by LIDAR controller 120) to identify the approximate magnitude of the output signals. One or more digital-to-analog converters (DAC) may be used to provide the reference signals for signal processing circuitry 118P.

The shielded SPADs may be used to measure one or more target parameters for the SPAD-based sensor 114. FIG. 6 shows an example of how a feedback loop may be used to optimize the bias voltage for the SPAD-based semiconductor device.

Dark pixel measurement circuitry 126 may measure a given parameter that impacts sensor performance (e.g., breakdown voltage, dark count rate, quench resistance). Dark pixel measurement circuitry 126 determines the magnitude of the given parameter. The magnitude of the given parameter may be provided as output to LIDAR processing circuitry 120 (sometimes referred to as simply processing circuitry 120). The measured value for the parameter may also be provided directly to system-level processing circuitry 101 if desired.

In addition to the measured value for the parameter, LIDAR processing circuitry receives a target value for the parameter (e.g., from system processing circuitry 101, from user input, etc.). LIDAR processing circuitry 120 may itself generate the target value for the parameter if desired (e.g., based on incident light levels, user input, and/or other factors). LIDAR processing circuitry 120 may compare the measured value to the target value and take action accordingly. For example, if the target value matches the measured value, LIDAR processing circuitry 120 may take no substantive action and continue to monitor the parameter based on the measured values from dark pixel measurement circuitry 126. If the target value does not match the measured value, LIDAR processing circuitry 120 may adjust the SPAD-based semiconductor device 114 using output stage 134. For example, output stage 134 may adjust the bias voltage for the SPAD-based semiconductor device based on information from LIDAR processing circuitry 120. Output stage 134 may include a power amplifier that changes the bias voltage for the SPAD-based semiconductor device.

To optimize the effectiveness of the dark pixel measurement circuitry 126, it is desirable for SPAD pixels 128 and 130 to be formed as part of the same array and to be kept at the same temperature. When these conditions are met, the assumption that the properties measured for shielded SPAD pixels 130 will match the properties of sensing SPAD pixels 128 is most accurate.

When breakdown voltage and/or dark count rate are determined by dark pixel measurement circuitry 126, this information may be used to operate the LIDAR imaging system in a constant over voltage mode or in a constant dark count rate mode. Shield 132 formed over SPADs 130 may be static or dynamic. A static shield will constantly shield the SPADs 130 from incident light. A dynamic shield (e.g., a shutter) may dynamically shield the SPADs (e.g., in a first state the shield may block incident light from SPADs 130 and in a second state the shield may allow incident light to pass to SPADs 130). Any number of SPADs may be statically shielded for dark pixel measurements and any number of SPADs may be dynamically shielded for dark pixel measurements.

As shown in FIG. 6, electrical connections 136 may optionally be formed between SPAD-based semiconductor device 114 (e.g., on a first chip) and the additional circuitry in the LIDAR module (e.g., on a second chip). This example is merely illustrative. In general, the LIDAR module may be formed using one chip, two chips, more than two chips, etc. The LIDAR module may be split between multiple chips in any desired manner.

Figure 7:
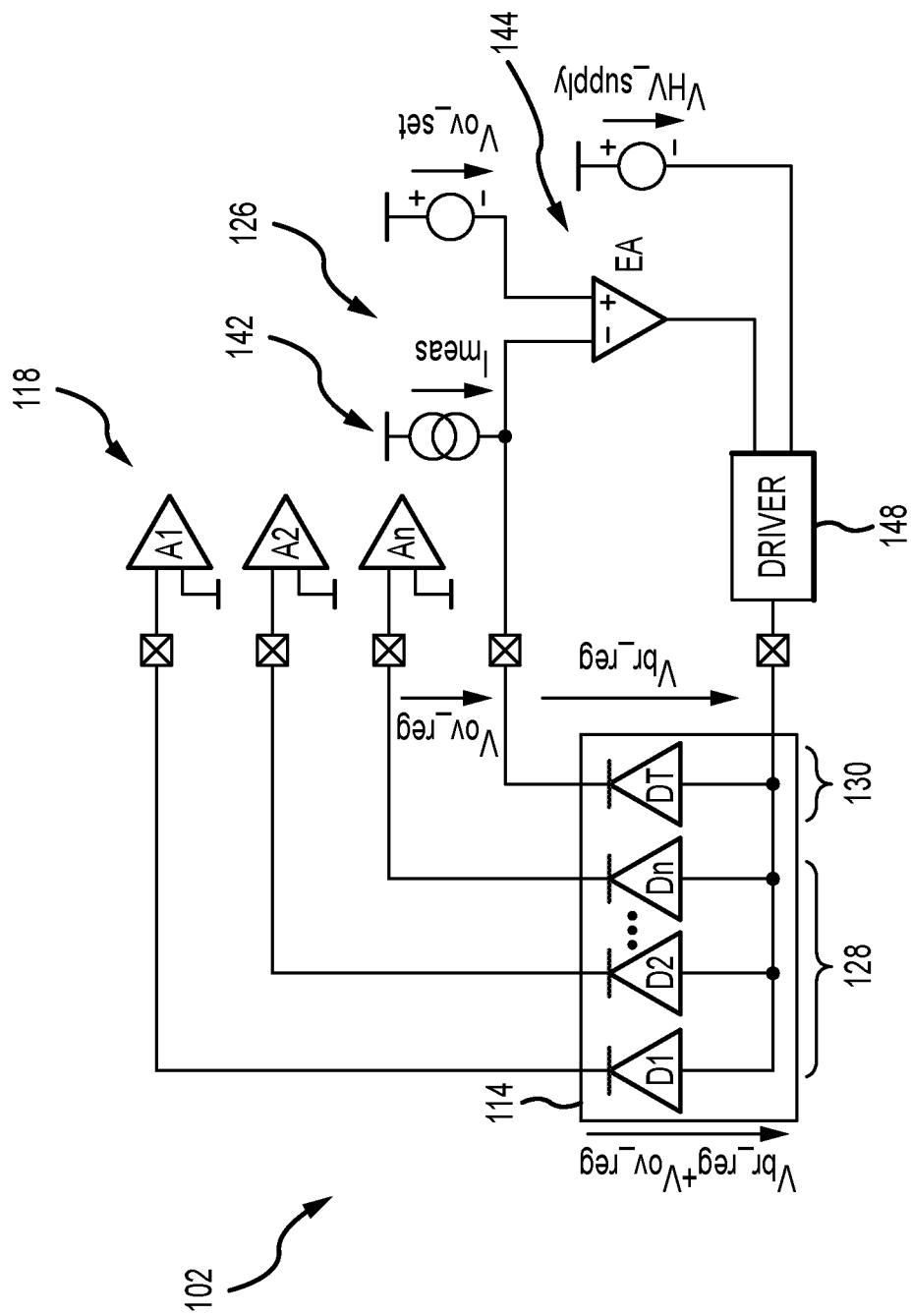
FIG. 7 is a diagram of an illustrative LIDAR module that includes processing circuitry for adjusting a SPAD bias voltage by regulating for constant over voltage in accordance with an embodiment.

FIG. 7 is a diagram of an illustrative LIDAR module with a feedback loop for optimizing over voltage for SPAD-based semiconductor device 114. As previously mentioned, one key parameter that affects the single-photon avalanche diodes of sensor 114 is breakdown voltage ($V_{BR}$). The breakdown voltage may be the reverse bias voltage above which an avalanche breakdown may occur. During operation, the single-photon avalanche diodes of sensor 114 may be reverse biased by a bias voltage ($V_{BIAS}$) that is equal to the breakdown voltage plus an over voltage ($V_{OV}$). In other words, $V_{BIAS}=V_{OV}+V_{BR}$. The magnitude of $V_{OV}$ may impact performance of the sensor (e.g., a higher $V_{OV}$ may increase the likelihood of an avalanche breakdown). $V_{BIAS}$ may be controllable in the sensor. However, without knowing the magnitude of $V_{BR}$, the exact magnitude of $V_{OV}$ cannot be known. Actively measuring (or compensating for) $V_{BR}$ may therefore allow for better optimizing of $V_{BIAS}$ by $V_{OV}$ adjustment during operation of the LIDAR imaging system.

In FIG. 7, a current source 142 is coupled to a terminal (e.g., the cathode) of one or more dark SPAD diode 130. Current source 142 may supply a measurement current $I_{MEAS}$ that is selected based on the temperature of the SPAD-based semiconductor device.

During normal sensing operations, the SPADs are biased well above the breakdown voltage, which is the largest reverse voltage that can be applied to the SPAD without causing an exponential increase in the leakage current in the diode. In this state, the SPAD may be referred to as being in a Geiger mode, due to each incident photon triggering a respective avalanche breakdown.

The magnitude of measurement current $I_{MEAS}$ may be selected such that dynamic resistance of the SPAD is very low and the SPAD is not in Geiger mode. While in this state, the voltage across the diode will be approximately equal to the breakdown voltage ($V_{br\_reg}$). The LIDAR module (e.g., driver 148, output stage 134, etc.) may additionally apply an over voltage ($V_{ov\_reg}$) to the SPADs.

SPAD 130 may be coupled to a first input terminal (e.g., the minus terminal) of error amplifier 144. Error amplifier 144 may have a second input terminal (e.g., the plus terminal) that receives a target over voltage ($V_{OV\_SET}$). FIG. 7 depicts the principle of regulation for constant overvoltage $V_{ov\_set}$. During operation, current source 142 forces measurement current $I_{MEAS}$ to the dark SPAD 130. The current is preferably moderated according to a sensor temperature to keep its value close to the current right above $V_{br\_reg}$. The consequence is that the SPAD 130 voltage drop is very close to $V_{br\_reg}$. The EA 144 has the target over voltage $V_{ov\_set}$ connected to its positive input and the regulation loop will establish the same voltage level (referenced to 0V) on the EA 144 negative input (e.g., by controlling driver 148). All SPADs 128 cathodes follow the voltage level of the input amplifiers A1 . . . An, which equals to 0V. For such an arrangement, the biasing voltage of SPADs 128 follows $V_{BIAS}=V_{ov\_set}+V_{br\_reg}$. Thus constant $V_{ov\_set}$ is maintained.

In this way, the LIDAR module may ensure that the over voltage is equal to a target over voltage. It should be noted that additional components may be included to directly measure the breakdown voltage if desired (e.g., by measuring the voltage drop across the dark SPAD diode while $I_{meas}$ is applied).

The magnitude of measurement current $I_{meas}$ may be based on the temperature of the SPAD-based semiconductor device. LIDAR imaging module 102 and/or system 100 may have a temperature sensor that is used to obtain a temperature measurement. One or more temperature measurements from the one or more temperature sensors in the system may be used to estimate the temperature of the SPADs in device 114. This temperature is in turn used to estimate the magnitude of $I_{meas}$ needed to place the dark SPAD in the low resistance, non-Geiger mode.

In some cases, the temperature of the SPAD devices may not be available (e.g., if a temperature sensor is not included in the system). In this situation, $I_{meas}$ may be swept across a range of magnitudes. At each magnitude of $I_{meas}$, the voltage drop across the SPAD may be measured. These data points may be used to construct a characteristic I/V (current vs. voltage) curve for the SPAD at the real-time temperature. From the determined I/V curve, the breakdown voltage may be identified and/or an appropriate $I_{meas}$ magnitude may be identified for over voltage control (as in FIG. 7).

In FIG. 7, any subset of current source 142, error amplifier 144, and driver 148 may be referred to as measurement circuitry 126 and/or LIDAR processing circuitry 120.

Figure 8:
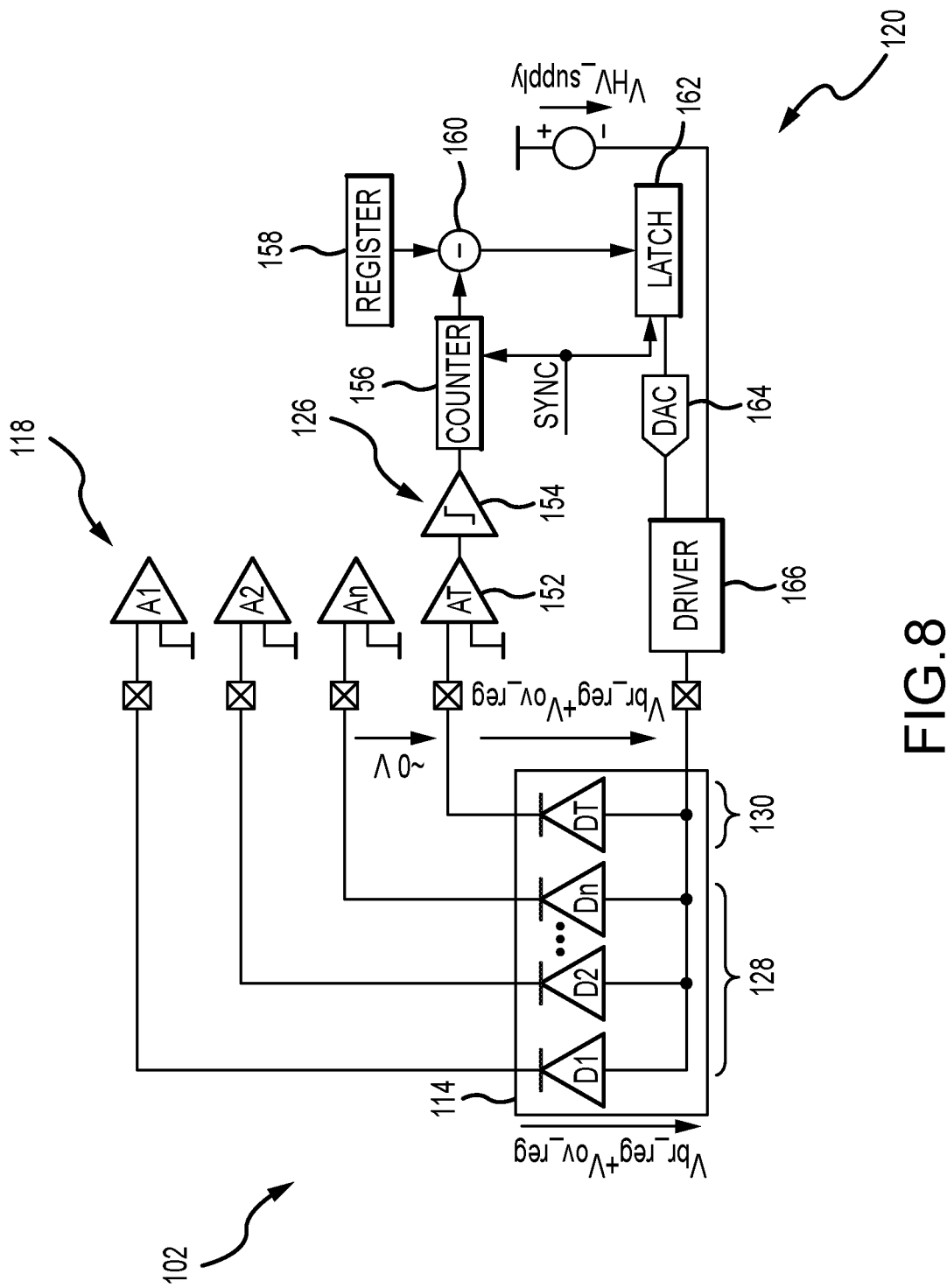
FIG. 8 is a diagram of an illustrative LIDAR module that includes processing circuitry for adjusting a SPAD bias voltage by regulating for constant dark count rate in accordance with an embodiment.

FIG. 8 is a diagram of an illustrative LIDAR module with a feedback loop for optimizing dark count rate (DCR) for SPAD-based semiconductor device 114. The dark count rate is the amount of photons that are detected even without exposure to incident light. If the dark count rate is higher than desired, noise may be undesirably high throughout the SPAD-based semiconductor device. If the dark count rate is lower than desired, than the sensitivity of the SPAD-based semiconductor device may be lower than desired.

In FIG. 8, an analog amplifier 152 is coupled to a terminal (e.g., the cathode) of one or more dark SPADs 130. Analog amplifier 152 may have the same reference voltage as amplifiers A1, A2, etc. in receiver 118. The output from amplifier 152 may be provided to comparator 154. Comparator 154 compares the input to a threshold voltage to determine when an avalanche occurs at dark SPAD 130. When an avalanche occurs, counter 156 may increase its count by 1.

The number of avalanches caused by dark current may be counted over some length of time (e.g., 10 milliseconds or another desired length of time). A sync signal may be provided to counter 156 and latch 162 to reset the count after the selected length of time. After the length of time is complete, subtraction circuit 160 may subtract the avalanches counted by counter 156 from a target count provided by register 158. The result may be stored in latch 162 where optional additional post-processing may be performed. Driver 166 may adjust the bias voltage (and, correspondingly, the over voltage) for the SPAD-based semiconductor device based on the difference between the measured DCR and the target DCR. A digital-to-analog converter may optionally be interposed between latch 162 and driver 166. If the measured DCR is lower than the target, the over voltage may be increased by driver 166 to improve sensitivity of the SPAD-based semiconductor device. If the measured DCR is higher than the target, the over voltage may be lowered by driver 166 to reduce dark current in the SPAD-based semiconductor device.

In FIG. 8, any subset of amplifier 152, comparator 154, counter 156, register 158, subtraction circuit 160, latch 162, DAC 164, and driver 166 may be referred to as measurement circuitry 126 and/or LIDAR processing circuitry 120. For example, amplifier 152, comparator 154, counter 156 may be collectively referred to as dark pixel measurement circuitry 126.

It should be noted that the dark SPADs in FIGS. 7 and 8 may be covered by shield 132 similar to as shown in FIG. 6.

Additionally, the arrows in FIGS. 7 and 8 follow the convention of having the arrow direction from positive to negative.

In the examples of FIGS. 6-8, the LIDAR module optimizes the over voltage for a single parameter in the system. In FIG. 7 the LIDAR module is optimized for breakdown voltage. In FIG. 8 the LIDAR module is optimized for dark count rate. These examples are merely illustrative. In some applications, it may be desirable to optimize the bias voltage for the SPAD-based semiconductor device based on multiple variables. The optimal bias point for a given device may depend on multiple parameters. Therefore, the LIDAR module may gather input regarding multiple parameters using measurement circuitry 126. The information regarding the multiple parameters is then used to select an optimal bias voltage for the system.

Figure 9:
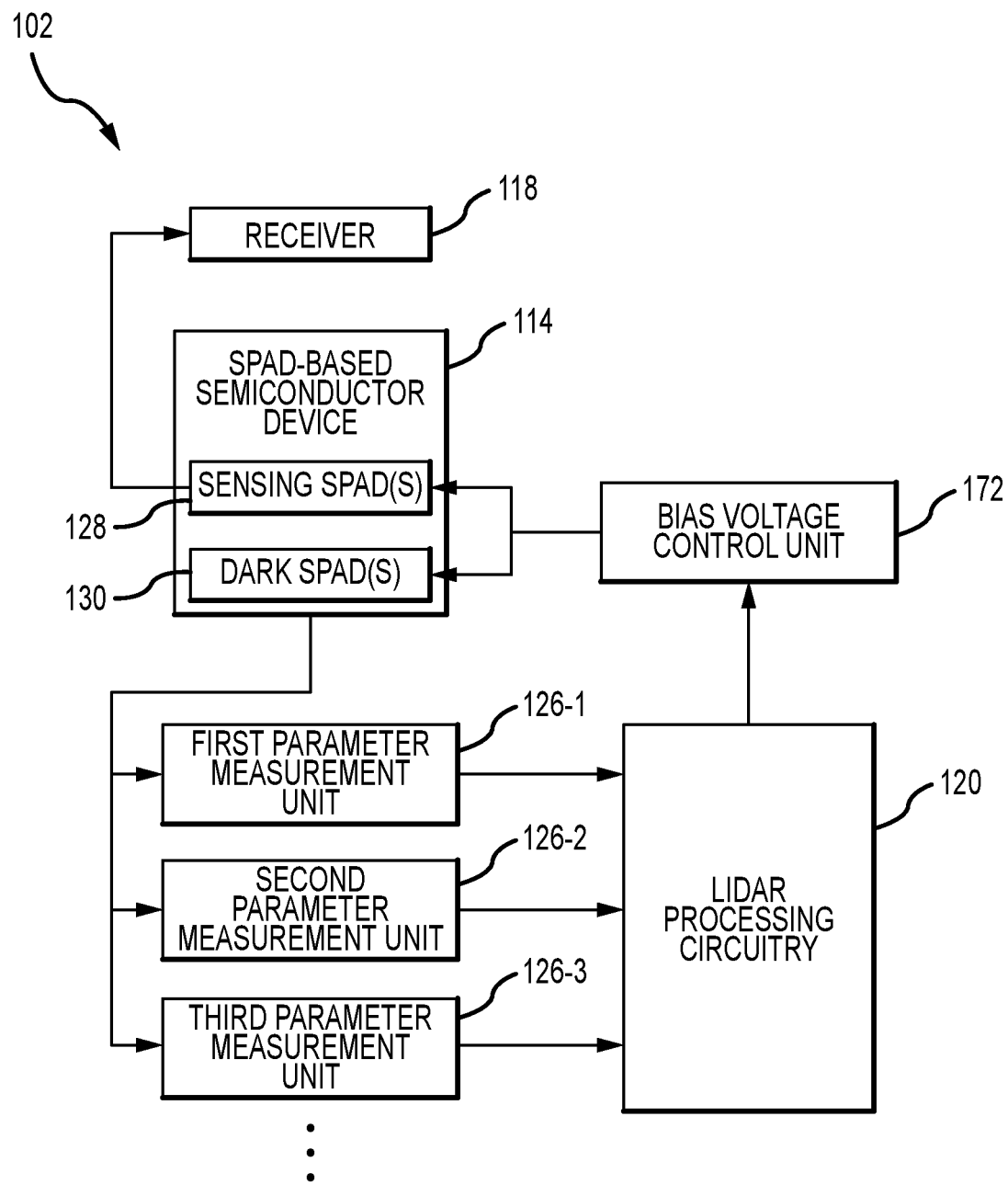
FIG. 9 is a diagram of an illustrative LIDAR module that includes processing circuitry for optimizing a SPAD bias voltage based on multiple measured parameters in accordance with an embodiment.

FIG. 9 is a schematic diagram of a LIDAR module that optimizes for multiple parameters. As shown, the dark SPADs 130 may be coupled to multiple different measurement units. A first measurement unit 126-1 may measure a first parameter (e.g., breakdown voltage), a second measurement unit 126-2 may measure a second parameter (e.g., dark count rate), a third measurement unit 126-3 may measure a third parameter (e.g., quench resistance), etc. In general, any desired number of measurement units may be included, with each measurement unit measuring a respective parameter of the dark SPAD(s). A multiplexer may optionally be included to couple the dark SPADs to a selected measurement unit of the plurality of measurement units.

LIDAR processing circuitry 120 may receive information from the measurement units. Based on the measured parameters, LIDAR processing circuitry 120 may determine an optimal bias voltage and may control bias voltage control unit 172 (e.g., similar to output stage 134 in FIG. 6) to provide the optimal bias voltage to the SPAD-based semiconductor device. The optimization algorithm used by LIDAR processing circuitry 120 may depend on application preferences and specific pixel properties of the SPAD-based semiconductor device.

As one illustrative example, first parameter measurement unit 126-1 may include the measurement circuitry of FIG. 7 and second parameter measurement unit 126-2 may include the measurement circuitry of FIG. 8.

In the embodiments of FIGS. 6-9, sensor parameters are monitored in order to regulate the over voltage of the SPAD-based semiconductor device to a target level. However, it should be understood that the sensor parameters may also be monitored (measured) in a similar manner for the purpose of sensor diagnostics (e.g., ensuring the sensor is operating properly).

The foregoing is merely illustrative and various modifications can be made by those skilled in the art. The foregoing embodiments may be implemented individually or in any combination.

What is claimed is:

1. A system, comprising:
   a semiconductor device that includes sensing single-photon avalanche diodes and a shielded single-photon avalanche diode; and
   processing circuitry that is coupled to the shielded single-photon avalanche diode, wherein the processing circuitry is configured to update a bias voltage for the sensing single-photon avalanche diodes based on feedback from the shielded single-photon avalanche diode and wherein the processing circuitry comprises a current source that is configured to apply a measurement current to the shielded single-photon avalanche diode.

2. The system defined in claim 1, wherein the processing circuitry comprises:
   an error amplifier having first and second inputs, wherein the first input is coupled to the shielded single-photon avalanche diode and the second input is coupled to a target over voltage.

3. The system defined in claim 2, wherein the processing circuitry is configured to update the bias voltage for the sensing single-photon avalanche diodes based on an output from the error amplifier.

4. A system, comprising:
   a semiconductor device that includes sensing single-photon avalanche diodes and a shielded single-photon avalanche diode; and
   processing circuitry that is coupled to the shielded single-photon avalanche diode, wherein the processing circuitry is configured to update a bias voltage for the sensing single-photon avalanche diodes based on feedback from the shielded single-photon avalanche diode and wherein the processing circuitry comprises a comparator that identifies when an avalanche occurs in the shielded single-photon avalanche diode.

5. The system defined in claim 4, wherein the processing circuitry comprises a counter that receives an output from the comparator and counts a number of avalanches in the shielded single-photon avalanche diode.

6. The system defined in claim 5, wherein the processing circuitry is configured to:
   determine a difference between the number of avalanches in the shielded single-photon avalanche diode from the counter and a target number of avalanches in the shielded single-photon avalanche diode; and
   update the bias voltage for the sensing single-photon avalanche diodes based on the difference.

7. The system defined in claim 1, wherein the processing circuitry is configured to update the bias voltage for the sensing single-photon avalanche diodes based on feedback from the shielded single-photon avalanche diode regarding a single parameter.

8. The system defined in claim 1, wherein the processing circuitry is configured to update the bias voltage for the sensing single-photon avalanche diodes based on feedback from the shielded single-photon avalanche diode regarding multiple parameters.

9. The system defined in claim 1, wherein the processing circuitry is configured to update the bias voltage for the sensing single-photon avalanche diodes based on feedback regarding a breakdown voltage.

10. A system, comprising:
    a semiconductor device that includes at least one sensing single-photon avalanche diode and at least one dark single-photon avalanche diode;
    a first measurement unit that is coupled to the at least one dark single-photon avalanche diode and that is configured to measure a first parameter for the at least one dark single-photon avalanche diode;

a second measurement unit that is coupled to the at least one dark single-photon avalanche diode and that is configured to measure a second parameter for the at least one dark single-photon avalanche diode; and processing circuitry that is configured to:
  determine an optimal bias voltage for the semiconductor device based on the measured first parameter and the measured second parameter; and
  adjust a bias voltage for the semiconductor device to the determined optimal bias voltage.

11. The system defined in claim 10, wherein the first and second parameters comprise parameters selected from the group consisting of: dark count rate, breakdown voltage, and quench resistance.

12. The system defined in claim 10, wherein the first parameter is dark count rate and wherein the second parameters comprise a parameter selected from the group consisting of: breakdown voltage and quench resistance.

* * * * *